United States Patent
Schlachter et al.

(10) Patent No.: US 8,077,526 B1
(45) Date of Patent: Dec. 13, 2011

(54) LOW POWER SSTL MEMORY CONTROLLER

(75) Inventors: Scott B. Schlachter, San Jose, CA (US); Steven E. McNeil, Albuquerque, NM (US); Kevin A. Mefford, Austin, TX (US)

(73) Assignee: Xilinx, Inc., San Jose, CA (US)

( * ) Notice: Subject to any disclaimer, the term of this patent is extended or adjusted under 35 U.S.C. 154(b) by 415 days.

(21) Appl. No.: 12/363,707

(22) Filed: Jan. 30, 2009

(51) Int. Cl.
*G11C 7/00* (2006.01)
(52) U.S. Cl. .............. 365/189.05; 365/63; 365/230.08
(58) Field of Classification Search ............. 365/189.05, 365/63, 230.08
See application file for complete search history.

(56) References Cited

U.S. PATENT DOCUMENTS

| 6,944,092 | B2 * | 9/2005 | Kang ............... 365/233.13 |
| 7,315,188 | B2 * | 1/2008 | Wang et al. ......... 327/108 |
| 2005/0180235 | A1 * | 8/2005 | Lee .................. 365/203 |

OTHER PUBLICATIONS

Ng, Samson, "DDR2 SDRAM Interface for Spartan-3 Generation FPGAs," XAPP454 (v.2.1), Jan. 20, 2009, available from Xilinx, Inc., 2100 Logic Drive, San Jose, California 95124.

* cited by examiner

*Primary Examiner* — Son Dinh
(74) *Attorney, Agent, or Firm* — Kenneth Glass; Kevin T. Cuenot

(57) ABSTRACT

An integrated circuit device having configurable resources is configured as a memory controller that includes a plurality of bi-directional pins, an input buffer circuit that is operable to receive SSTL-compliant input and an output buffer circuit that is operable to generate SSTL-compliant output. The input buffer circuit includes a first single-ended buffer coupled to a first voltage source and to a ground voltage. The first single-ended buffer has an input coupled to one of the bi-directional pins and has an output coupled to the control logic of the memory controller.

20 Claims, 7 Drawing Sheets

LOW POWER SSTL MEMORY CONTROLLER

BACKGROUND OF THE INVENTION

Conventional memory controllers for high-speed memory devices such as Double Data Rate (DDR) Synchronous Dynamic Random Access Memory (SDRAM) integrated circuit devices allow for fast data storage and retrieval. However, conventional memory controllers for DDR SDRAM devices have high power consumption.

The SSTL18 interface, as specified in the JESD-15 standard, published by the Joint Electron Device Engineering Council, specifies the operating requirements for DDR2 SDRAM memory devices. Memory controllers for operating DDR2 SDRAM devices provide inputs to each DDR2 SDRAM device to be operated and outputs from each DDR2 SDRAM device that fully meet the SSTL18 interface requirements to assure that the memory controller will operate correctly with any DDR2 SDRAM device.

In many systems there is a need for low cost memory. Because of economies of scale, DDR2 SDRAM devices are the least expensive option for such systems. Thus, many systems that do not require high speed operation utilize DDR2 SDRAM memory and operate the DDR2 SDRAM memory at the lowest allowed speed in the SDRAM's data sheet specifications, which is 125 MHz. This provides good results for many applications. However, some applications also require low power consumption.

For systems that require low cost memory and low power consumption, there is a need for a memory controller having reduced power consumption as compared to conventional DDR2 SDRAM memory controllers. Much of the power consumed by conventional memory controllers is consumed by the many input buffers that interface with DDR2 SDRAMs. More particularly, since differential input buffers are required to meet the small input swing required to meet the Vil (max) and Vih (min) threshold defined in the SSTL18 interface standard, conventional memory controllers utilize differential input buffers, with one side of the differential input buffer tied to the reference voltage (Vref) and the other side connected to the SSTL18 signal line. For example, in a conventional memory controller manufactured by Xilinx Inc. of San Jose, Calif. that includes a Spartan-3A Field Programmable Gate Array (FPGA) integrated circuit device configured with a "MAC" memory controller for controlling DDR2 SDRAM devices, each input buffer consumes about 2 mA of static current from a 3.3 volt VccAux power rail. Accordingly, a 72-bit DDR2 SDRAM interface with 90-bi-directional SSTL18 IO will consume about 600 mW of static power, which is more than half of the total power consumed by the entire memory controller design.

Accordingly there is a need for a memory controller having reduced static power requirements. In addition, there is a need for a method and apparatus that will allow for control of DDR2 SDRAM devices that has reduced power requirements.

SUMMARY OF THE INVENTION

An integrated circuit device is disclosed that has configurable logic and that is configured as a memory controller. The memory controller is operable to generate SSTL18-compliant output and receive SSTL18-compliant input at bi-directional pins of the memory controller. Each of the bi-directional pins is coupled to an input buffer circuit and an output buffer, where each input buffer circuit includes a single-ended buffer having an input coupled to the bi-directional pin, coupled to a first voltage source and coupled to a ground voltage, the output of the single-ended buffer coupled to the control logic of the memory controller. By using a single-ended buffer instead of a differential amplifier for each input circuit, static power is significantly reduced.

In accordance with one aspect of the present invention, the output circuit includes an output buffer that is powered by the first voltage source. In the present embodiment the first voltage source is a 1.8 Volt source, providing SSTL18-compliant output from each output circuit and allowing for receiving SSTL18-compliant input using a memory controller having reduced static power requirements.

The methods and apparatus of the present invention provide a memory controller having reduced static power requirements. In addition, the method and apparatus of the present invention allow for control of DDR2 SDRAM devices and have reduced power requirements as compared to conventional devices and systems that have input circuits that use differential amplifiers for receiving input. These and other advantages of the present invention will no doubt become obvious to those of ordinary skill in the art after having read the following detailed description of the preferred embodiments, which are illustrated in the various drawing figures.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention. In the drawings.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
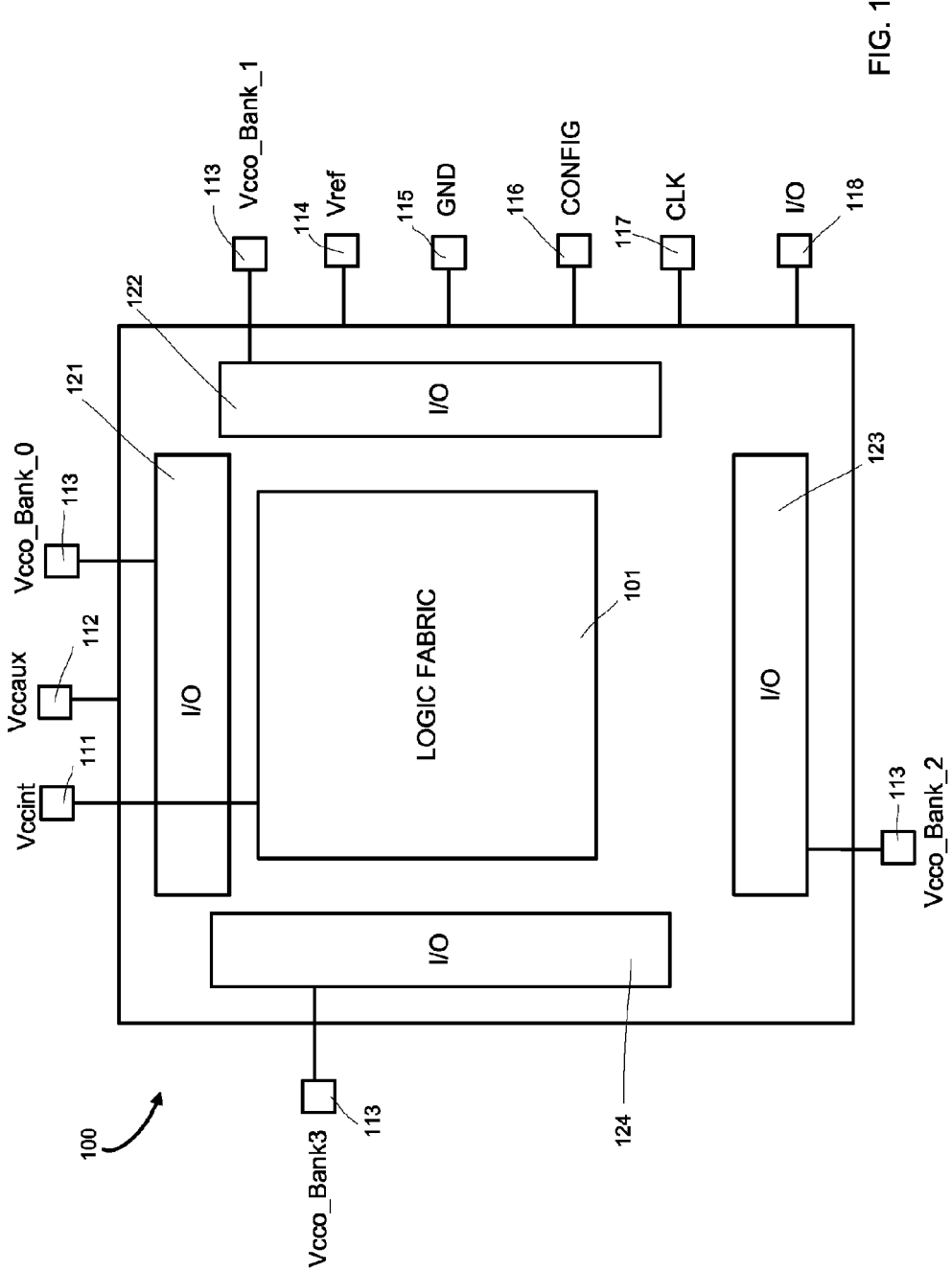
FIG. 1 shows an integrated circuit device having configurable logic, and shows some of the input and output pins of the integrated circuit device in accordance with an embodiment of the present invention.

FIG. 1 shows an integrated circuit device 100 that includes logic fabric 101 and input and output blocks 121-124. Core logic power supply pins, represented by exemplary core logic power supply pin 111 are dedicated pins that supply power to the internal core logic fabric 101. Although a single core logic power supply pin 111 is shown, in the present embodiment integrated circuit device 100 includes a plurality of internal core logic power supply pins 111, with the number of internal core logic power supply pins varying in accordance with the type of integrated circuit device 100 and the package used. In the present embodiment core logic power supply pins 111 supply a voltage (Vccint) of 1.0 Volts or 1.2 Volts.

Auxiliary power supply pins, represented by exemplary auxiliary power supply pin 112, are dedicated pins that supply power to the auxiliary circuits of integrated circuit device 100. Although a single auxiliary power supply pin 112 is shown, in the present embodiment integrated circuit device 100 includes a plurality of auxiliary power supply pins 112, with the number of auxiliary logic power supply pins varying in accordance with the type of integrated circuit device 100 and the package used. In the present embodiment auxiliary power supply pin 112 supplies a voltage (VccAux) of either 2.5 Volts or 3.3 Volts.

Output buffer power supply pins, represented by exemplary output buffer power supply pins 113, are dedicated pins that supply power to the output buffer of input and output blocks 121-124. Although a single output buffer power supply pin 113 is shown to couple to each of input and output blocks 121-124, in the present embodiment integrated circuit device 100 includes a plurality of output buffer power supply pins 113 that supply power to each input and output block 121-124, with the number of output buffer power supply pins varying in accordance with the type of integrated circuit device 100 and the package used. In the present embodiment output buffer power supply pins 113 supply a voltage (Vcco) that also sets the input threshold voltage for some input and output standards.

Reference voltage power supply pins, represented by exemplary reference voltage power supply pin 114, are dedicated pins that supply a reference voltage (Vref) to input and output blocks 121-124. Although a single reference voltage power supply pin 114 is shown to couple to each of input and output blocks 121-124, in the present embodiment integrated circuit device 100 includes a plurality of reference voltage power supply pins 114 that supply power to each input and output block 121-124, with the number of reference voltage power supply pins varying in accordance with the type of integrated circuit device 100 and the package used.

Ground pins, represented by exemplary ground pin 115 are dedicated pins that supply a ground potential (GND) to integrated circuit device 100. In the present embodiment ground pins 115 supply a ground potential (GND) that is 0 volts. Input and output pins, represented by exemplary input and output pin (I/O) 118, provide input to integrated circuit device 100 and provide output from integrated circuit device 100. Configuration pins, represented by exemplary configuration pin 116, allow for configuration of integrated circuit device 100. Clock pins, represented by exemplary clock pin (CLK) 117, provide clock signals to integrated circuit device 100 and from integrated circuit device 100. Though a single one of each of exemplary pins 115-118 is shown to connect to input and output bank 122, in the present embodiment, integrated circuit device 100 includes more than one of each type of pins 115-118, with one or more of each type of pin 115-118 coupling to one or more of input and output banks 121-124.

Although integrated circuit device 100 is shown to include four input and output blocks 121-125, alternatively, integrated circuit device 100 could have more or fewer input and output blocks 121-124.

Figure 2:
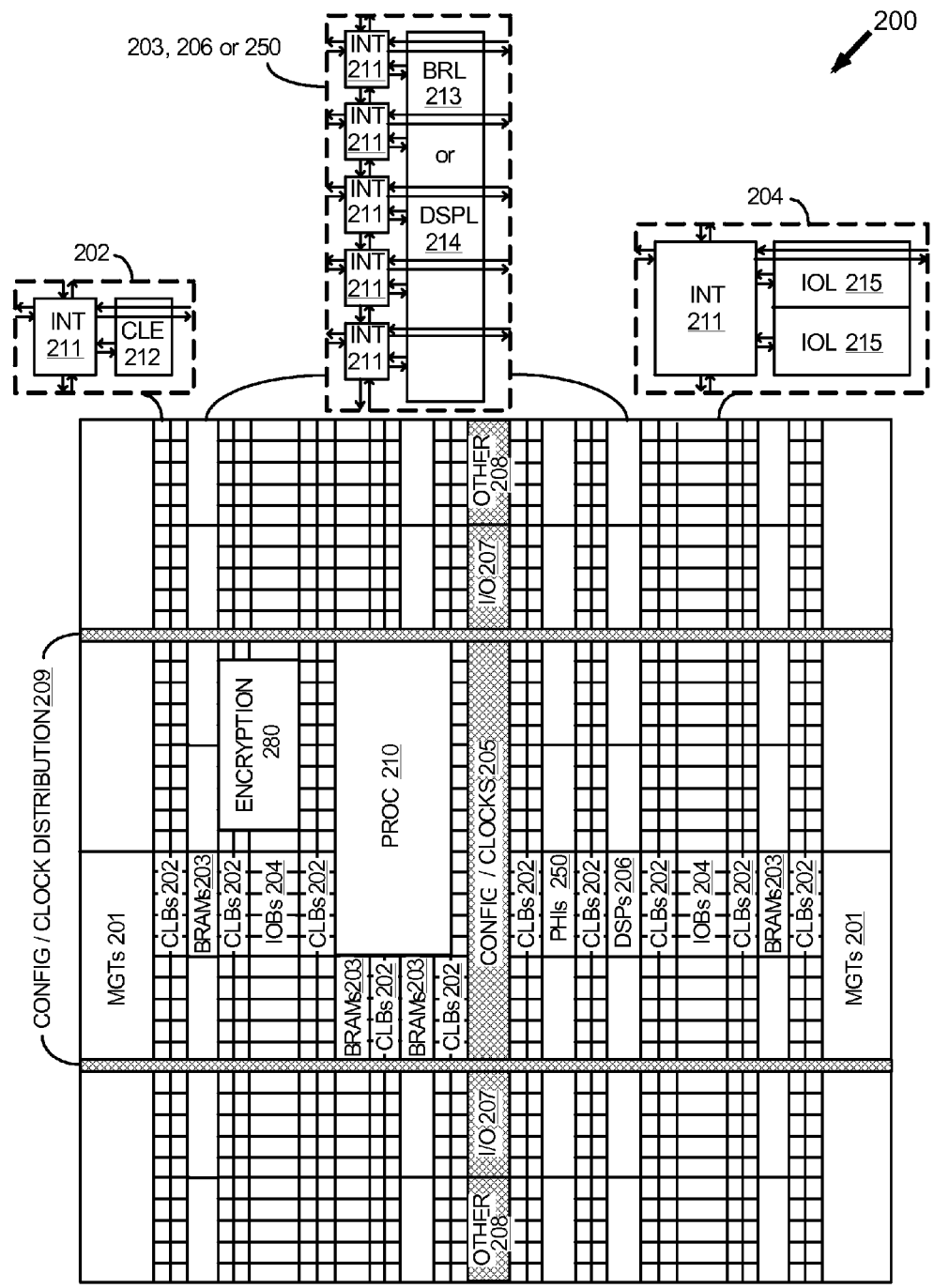
FIG. 2 shows a field programmable gate array architecture in accordance with an embodiment of the present invention.

In the embodiment that is shown in FIG. 2 integrated circuit device 100 is a Field Programmable Gate Area (FPGA) die having a FPGA architecture 200 that includes a large number of different programmable tiles including multi-gigabit transceivers (MGTs 201), configurable logic blocks (CLBs 202), random access memory blocks (BRAMs 203), input/output blocks (IOBs 204), configuration and clocking logic (CONFIG/CLOCKS 205), digital signal processing blocks (DSPs 206), specialized input/output blocks (I/O 207) (e.g., configuration ports and clock ports), interface tiles (PHIs) 250 and other programmable logic 208 such as digital clock managers, analog-to-digital converters, system monitoring logic, and so forth. In addition, integrated circuit device 100 may include one or more dedicated processor blocks (PROC 210) and/or an encryption logic block (ENCR 280).

In some FPGAs, each programmable tile includes a programmable interconnect element (INT 211) having standardized connections to and from a corresponding interconnect element in each adjacent tile. Therefore, the programmable interconnect elements taken together implement the programmable interconnect structure for the FPGA. The programmable interconnect element (INT 211) also includes the connections to and from the programmable logic element within the same tile, as shown by the examples included at the top of FIG. 2.

For example, a CLB 202 can include a configurable logic element (CLE 212) that can be programmed to implement user logic plus a single programmable interconnect element (INT 211). A BRAM 203 can include a BRAM logic element (BRL 213) in addition to one or more programmable interconnect elements. Typically, the number of interconnect elements included in a tile depends on the height of the tile. In the pictured embodiment, a BRAM tile has the same height as five CLBs, but other numbers (e.g., six) can also be used. A DSP tile 206 can include a DSP logic element (DSPL 214) in addition to an appropriate number of programmable interconnect elements. An 10B 204 can include, for example, two instances of an input/output logic element (IOL 215) in addition to one instance of the programmable interconnect element (INT 211). As will be clear to those of skill in the art, the actual I/O pads connected, for example, to the I/O logic element 215 are manufactured using metal layered above the various illustrated logic blocks, and typically are not confined to the area of the input/output logic element 215.

In the pictured embodiment, a columnar area near the center of the die (shown shaded in FIG. 2) is used for configuration, clock, and other control logic. Horizontal areas 209 extending from this column are used to distribute the clocks and configuration signals across the breadth of the FPGA.

Some FPGAs utilizing the architecture illustrated in FIG. 2 include additional logic blocks that disrupt the regular columnar structure making up a large part of the FPGA. The additional logic blocks can be programmable blocks and/or dedicated logic. For example, the processor block PROC 210 shown in FIG. 2 spans several columns of CLBs and BRAMs.

Note that FIG. 2 is intended to illustrate only an exemplary FPGA architecture. For example, the numbers of logic blocks in a column, the relative width of the columns, the number and order of columns, the types of logic blocks included in the columns, the relative sizes of the logic blocks, the incorporation of hard blocks such as PROC 210, and the interconnect/logic implementations included at the top of FIG. 2 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

Figure 3:
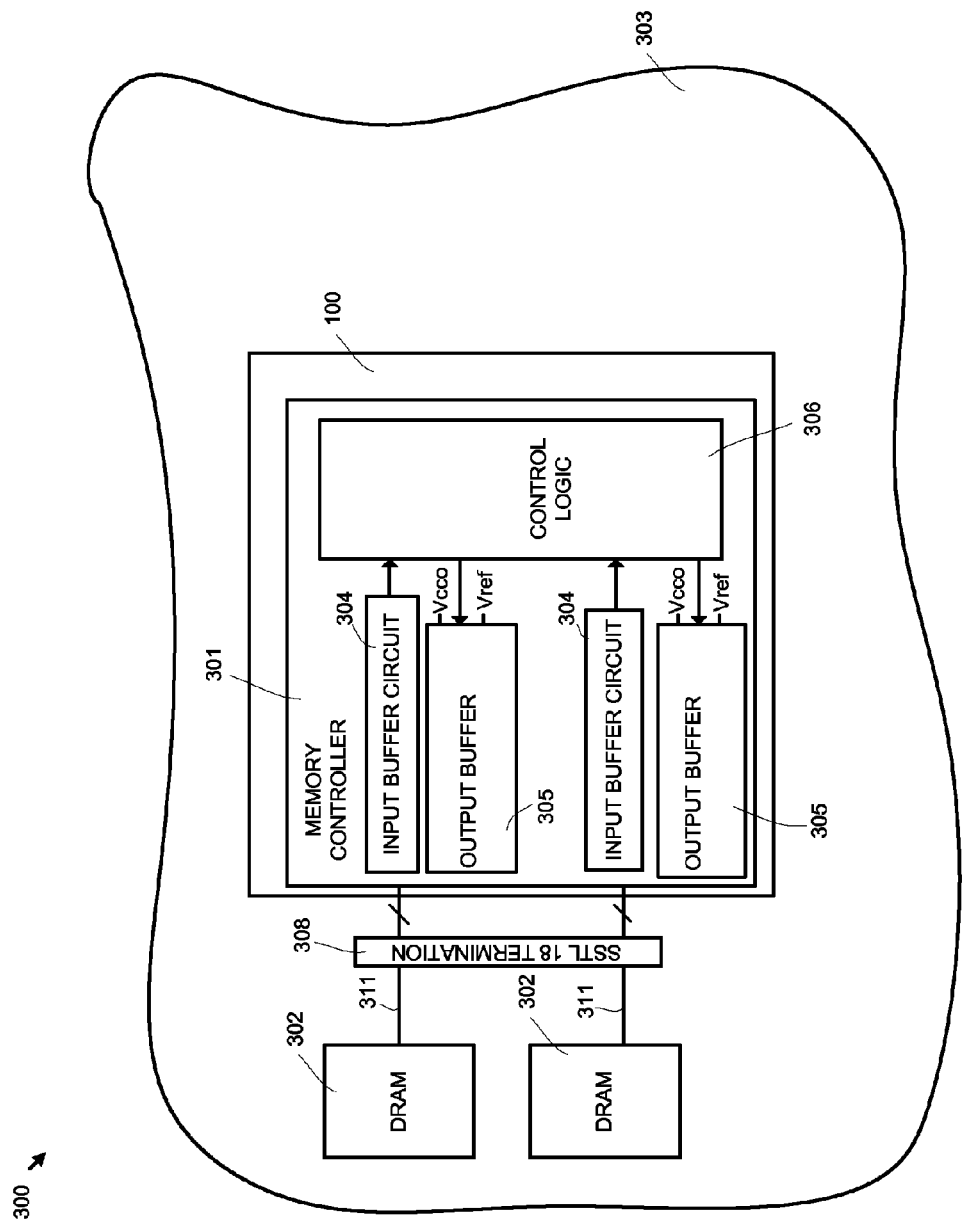
FIG. 3 is a diagram of a integrated circuit device that is configured as a memory controller where the memory controller and DRAM devices are coupled to a circuit board in accordance with an embodiment of the present invention.

FIG. 3 shows a system 300 that includes a circuit board 303, a plurality of Dynamic Random Access Memory (DRAM) devices 302 coupled to the circuit board 303 and an integrated circuit device 100 that is also coupled to circuit board 303. In the present embodiment integrated circuit device 100 is a field programmable gate array device having some or all of the features shown in FIGS. 1-2.

Continuing with FIG. 3, integrated circuit device 100 is shown to be configured so as to form a memory controller 301. Memory controller 301 is coupled to DRAM devices 302 by conductive traces 311, some of which are terminated such that the communication paths between memory controller 301 and DRAM devices 302 comply with a SSTL interface specification. Thereby, a plurality of parallel channels of DRAM memory are provided that can be accessed by memory controller 301, with memory controller 301 operable to store data on DRAM devices 302 and retrieve data from DRAM devices 302.

In the present embodiment integrated circuit device 100 is a packaged integrated circuit device that is attached to a circuit board 303 using solder. In this embodiment DRAM devices 302 are also attached to circuit board 303 using solder, with integrated circuit device 100 and DRAM devices 302 electrically coupled together by traces on circuit board 303. In one embodiment circuit board 303 is a full-size circuit board. In another embodiment circuit board 303 is a Dual Inline Memory Module (DIMM) circuit card.

Memory controller 301 includes input buffer circuits 304 that are operable to receive SSTL-compliant input and output buffers 305 that are operable to generate SSTL-compliant output. Memory controller 301 also includes control logic 306 that is operable for controlling the operation of memory controller 301. In one embodiment integrated circuit device 101 is a Spartan 3a integrated circuit device, and memory controller 301 is a memory controller that includes the features disclosed in the reference titled "DDR2 SDRAM Interface for Spartan-3 Generation FPGAs," by Samson Ng, v2.1, Jan. 20, 2009, published by Xilinx Inc. of San Jose, Calif., which is hereby incorporated by reference in its entirety.

In one embodiment the SSTL-compliant output from output buffers 305 is SSTL18-compliant output and the SSTL-compliant input that is received at input buffer circuits 304 is SSTL18 compliant input. In this embodiment, DRAM devices 302 are DDR2 SDRAM devices and SSTL termination 308 of conductive traces 311 complies with the SSTL18 interface requirements specified in the JEDEC JESD8-15 standard, with memory controller 301 and the DDR2 SDRAMS conforming to the JEDEC JESD79-2e specification.

Output buffers 305 include a buffer that is powered by Vcco. In the present embodiment Vcco is 1.8 Volts.

Figure 4:
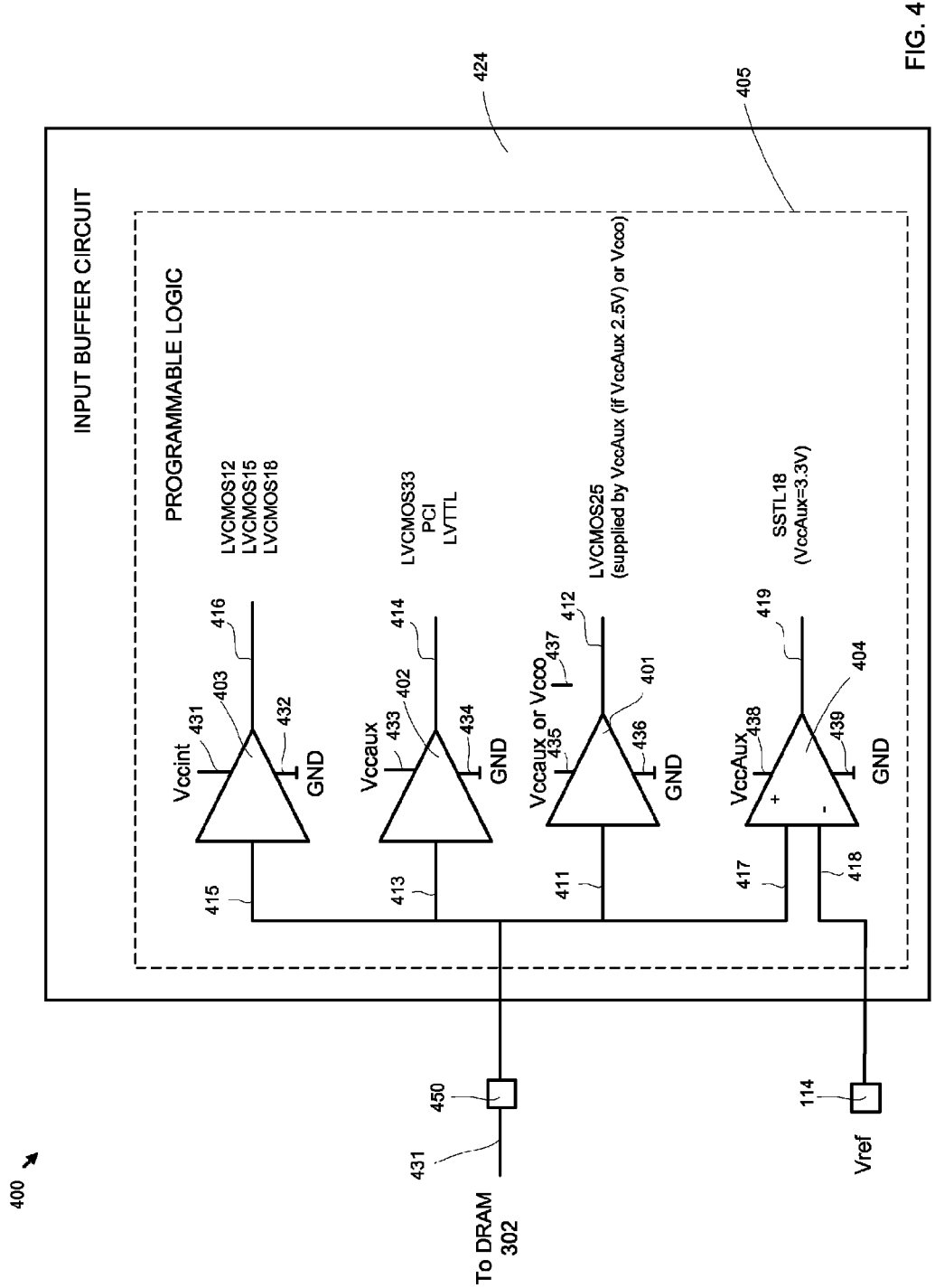
FIG. 4 illustrates components of an input buffer circuit that can be selected to define a configuration for a memory controller in accordance with an embodiment of the present invention.

FIG. 4 illustrates the components of a memory controller 400 that can be configured using programmable logic 405 to form a desired input buffer circuit configuration. Memory controller 400 includes a plurality of bi-directional pins, represented by bi-directional pin 450, each of which can be electrically coupled to DRAM devices 302. Input buffer circuit 424 includes a first single-ended buffer 401 having an input 411 coupled to bi-directional pin 450 and having an output 412 coupled to control logic 306. Single ended buffer 401 can be chosen as the operable buffer by selecting leg 436 that couples to a ground voltage, and selecting either leg 437 that couples to Vcco or leg 435 that couples to VccAux.

Input buffer circuit 424 also includes a second single-ended buffer 402 having an input 413 coupled to bi-directional pin 450 and having an output 414 coupled to control logic 306. Single ended buffer 402 can be chosen as the operable buffer by selecting leg 434 that couples to a ground voltage and selecting leg 433 that couples to auxiliary power supply pin (VccAux). Single-ended buffer 402 can be selected to generate a configuration in which input buffer circuit 424 is to couple LVCMOS 33, PCI or LVTTL input to control logic 306.

Input buffer circuit 424 includes a third single-ended buffer 403 having an input 415 coupled to bi-directional pin 450 and having an output 416 coupled to control logic 306. Single-ended buffer 403 can be chosen as the operable buffer by selecting leg 432 that couples to a ground voltage and selecting leg 431 that couples to core logic power supply (Vccint). Single-ended buffer 403 can be selected to generate a configuration in which input buffer circuit 424 is to couple LVCMOS12, LVCMOS15 or LVCMOS18 input to control logic 306.

Input buffer circuit 424 includes a differential buffer 404 having a first input 417 electrically coupled to bi-directional pin 450 and having a second input 418 coupled to a second voltage source (reference voltage supply pin 114). Differential buffer 404 has an output 419 that is coupled to control logic 306. Differential amplifier 404 can be chosen as the operable amplifier by selecting leg 439 that couples to a ground voltage and selecting leg 438 that couples to auxiliary power supply (VccAux). Differential amplifier 404 can be selected to generate a configuration in which input buffer circuit 424 is to couple SSTL18 input to control logic 306. In this embodiment VccAux is 3.3 Volts and Vref is 0.9 Volts.

Figure 5:
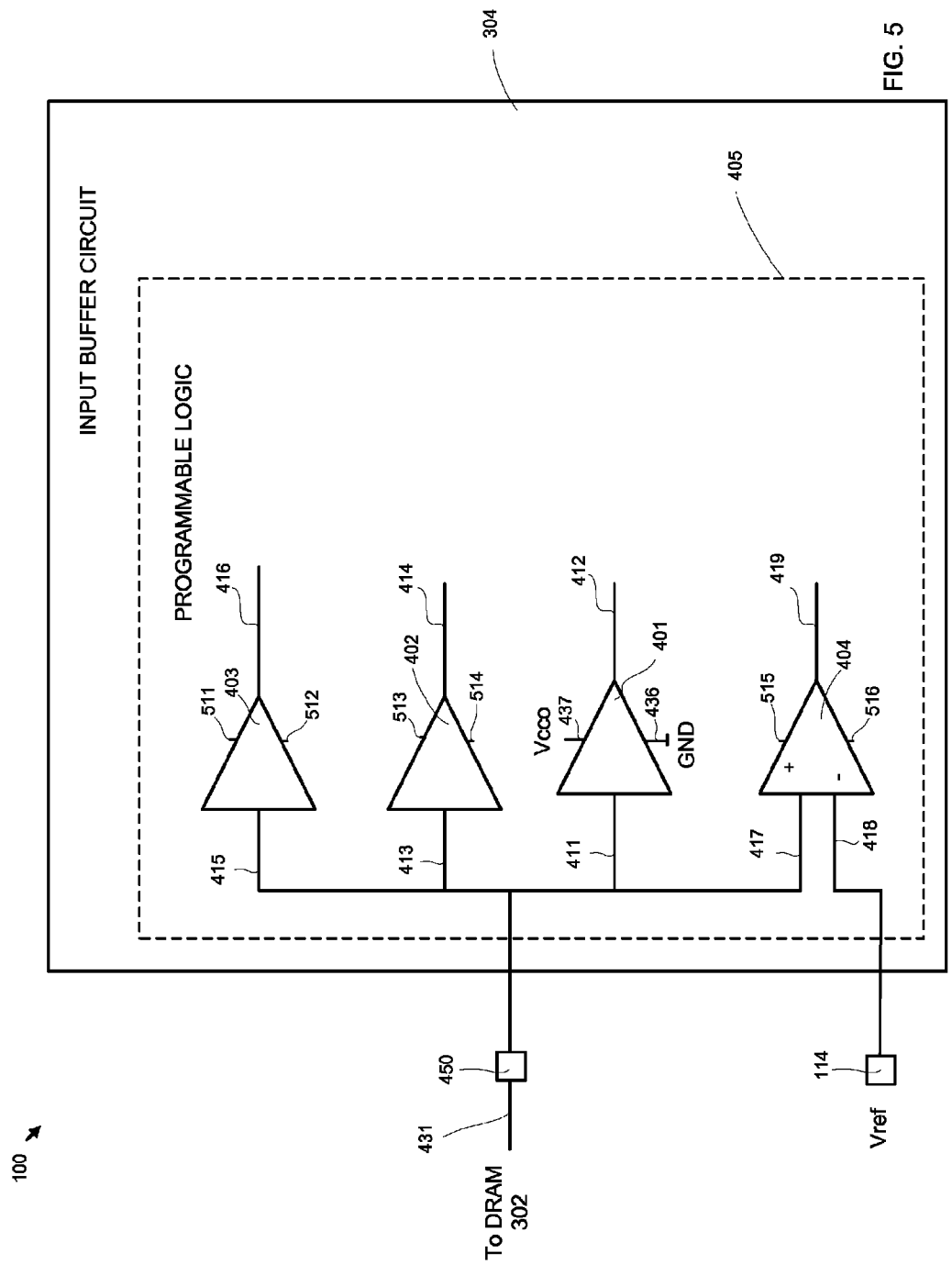
FIG. 5 is a diagram of an input buffer circuit that includes a single-ended buffer that is coupled to a bi-directional pin for coupling SSTL-compliant input into the integrated circuit device in accordance with an embodiment of the present invention.

FIG. 5 shows an embodiment in which integrated circuit device 100 is configured as a memory controller 304 that includes a plurality of bi-directional pins 450 and an input buffer circuit 304 that is operable to receive SSTL-compliant input. Input buffer circuit 304 includes a single-ended buffer 401 coupled to a first voltage level (Vcco) and to a ground voltage (GND). Single-ended buffer 401 has an input 411 coupled to bi-directional pin 450 and has an output 412 coupled to control logic 306.

In the present embodiment output buffers 305 generate SSTL18-compliant output and the SSTL-compliant input is SSTL18 compliant input. In this embodiment Vcco is 1.8 Volts and Vref is 0.9 Volts.

Continuing with FIG. 5, the power connection 515 of differential amplifier 404 is not connected to a voltage source such that differential amplifier 404 is not operable to couple input to control logic 306. The power connection 513 of single-ended buffer 402 is not connected to a voltage source such that single-ended buffer 402 is not operable to couple input to control logic 306. Also, the power connection 511 of the single-ended buffer 403 is not connected to a voltage source such that single-ended buffer 403 is not operable to couple input to the control logic 306.

The configuration of FIG. 5 can be used for coupling LVCMOS25 input to control logic 306 by applying a voltage of 2.5

Volts to Vcco. However, in the present embodiment a voltage of 1.8 Volts is applied to Vcco and voltage of 0.9 Volts is applied to Vref. Thereby the output buffers 305 operate in a normal fashion for generating SSTL18 output and input buffer circuits 304 receive SSTL18 input to generate output 412 at each single-ended buffer 401 that will be correct as long as the input 411 meets the switching requirements shown in FIG. 6.

Figure 6:
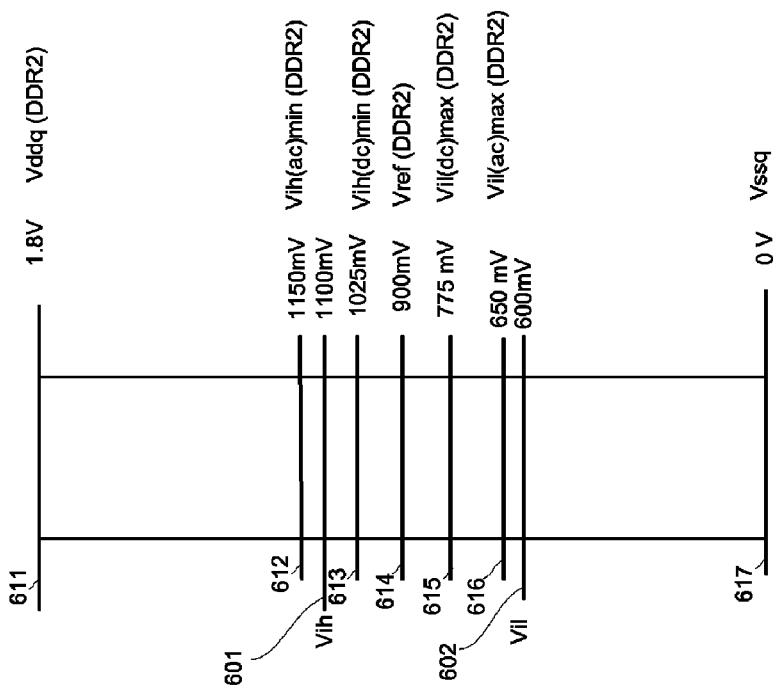
FIG. 6 illustrates switching voltage levels of a single-ended buffer as compared to SSTL18 standard requirements in accordance with an embodiment of the present invention.

Referring now to FIG. 6, a logic high will be generated at output 412 as long as the logical high input has a voltage that exceeds voltage threshold (Vih) of 1.1 Volts as shown by line 601. A logic low will be generated at output 412 as long as the logical low input has a voltage that is lower than the voltage threshold (Vil) of 0.6 Volts as shown by line 602. These values apply for both Direct Current (DC) and Alternating Current (AC) operation.

Though the hysteresis requirements of the input buffer circuit 304 are greater than the hysteresis requirements of the SSTL18 specification, the voltage thresholds Vih and Vil of input buffer circuit 304 are sufficiently close to the values of the SSTL18 specification such that accurate results will be obtained by selecting DRAM devices 302 and a printed circuit board designed to have reasonably good signal integrity quality.

More particularly, the voltage threshold Vih 601 of 1.1 Volts is actually slightly less than (and easier to achieve than) Vih(ac)min of 1.150 Volts shown by line 612 and only slightly greater than the Vih(dc)min of 1.025 Volts in the SSTL18 specification. Also, the voltage threshold Vil 602 of 0.600 Volts is only slightly less than Vil(dc)max of 0.775 Volts shown by line 615 and Vil(ac)max of 0.650 Volts in the SSTL18 specification.

It is advantageous that the methods and apparatus of the present invention allow for accurate input to be obtained without the need to provide a signal having a logical high near the maximum high voltage signal level (Vddq) of 1.8 V and without the need to provide a signal having a logical low near the maximum low voltage signal level (Vssq) of 0 Volts. Thereby accurate input is obtained while allowing the use of DDR2 DRAM devices 302 from a wide range of memory manufacturers.

Figure 7:
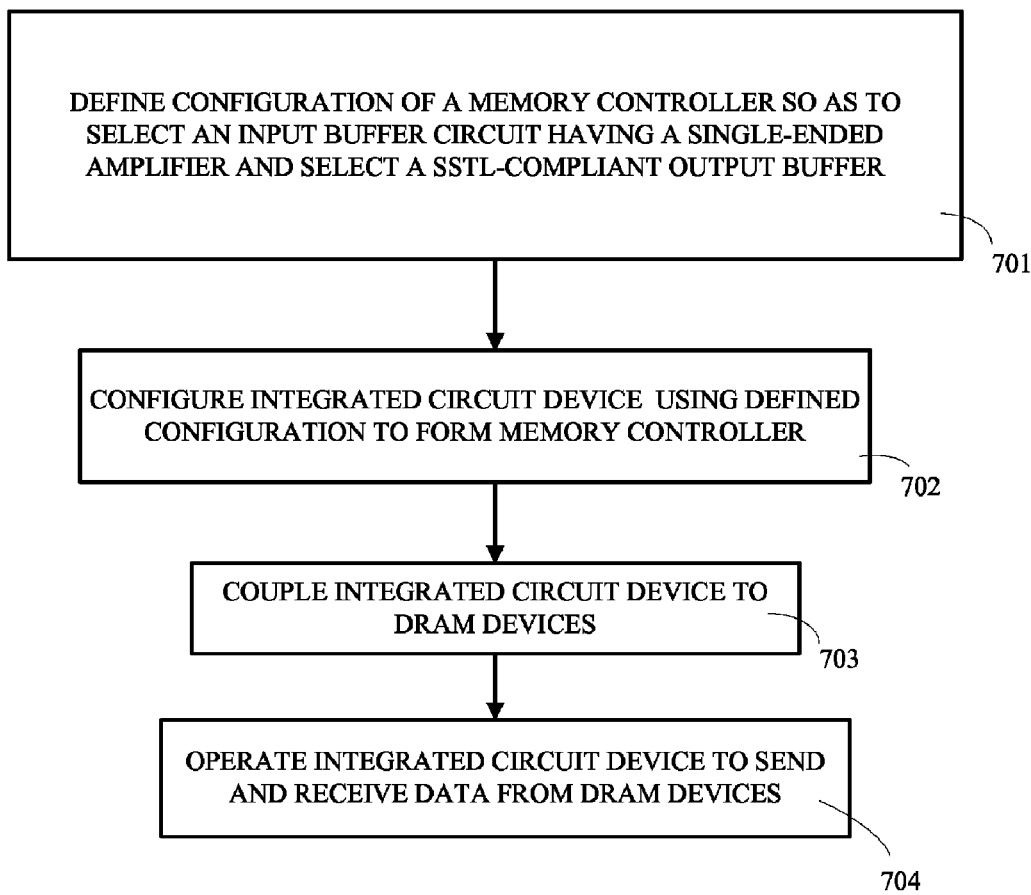
FIG. 7 illustrates a method for controlling a memory device in accordance with an embodiment of the present invention.

FIG. 7 illustrates a method 700 for controlling a memory device. As shown by step 701, a configuration of a memory controller is defined so as to select an input buffer circuit having a single-ended buffer and select an SSTL-compliant output buffer (e.g., a SSTL18 output buffer). In the present embodiment the single-ended buffer and the SSTL output buffer are defined to be powered at a first voltage Level. In one embodiment step 701 is performed using a software program that is operable on a computer to define a memory controller. More particularly, the software program is initiated and the operator moves through a series of screens so as to define the memory controller, with one or more of the screens allowing the user to select input buffers, output buffers, voltage levels, etc. In the embodiment shown in FIG. 4, the operator can select a LVCMOS25 input buffer, automatically defining the buffer of the input circuit as single-ended buffer 401. The user can then define the voltage source (e.g., Vcco) for the input buffer, either by specifically selecting a particular leg 437 or indicating a parameter (e.g., a voltage level) that will cause the program to automatically select the desired leg 437. In the present embodiment, the computer program automatically assigns the desired legs 437 to each input buffer connected to a bidirectional pin and automatically omits legs (e.g., legs 431, 433, and 438) so as to render buffers (e.g., buffers 431, 433 and 438) that are not selected inoperable. Alternatively, buffers that are not selected can either be omitted from the configuration or not coupled to bidirectional input pin 450.

Referring now to step 702, an integrated circuit device is configured using the defined configuration so as to form a memory controller having the single-ended buffer and having the SSTL-compliant output buffer. In the present embodiment step 802 forms a memory controller 301 shown in FIG. 3 that includes input buffer circuit 304 shown in FIG. 5.

As shown by step 703 the integrated circuit device is coupled to DRAM devices. In one embodiment step 703 is performed by coupling an integrated circuit device 100 and DRAM devices 302 to a circuit board 303 as shown in FIG. 3.

The integrated circuit device is operated as shown by step 704 to store and retrieve data. In one embodiment, integrated circuit 100 is connected to one or more DDR2 SDRAM device and is operably coupled to external circuitry, including coupling a first voltage level of 1.8 Volts to one or more Vcco pin 113, coupling a second voltage level to one or more Vref pin 114, coupling 1.2 Volts to one or more Vccint pin 111, and coupling 3.3 Volts to one or more VccAux pin 112.

In one embodiment step 701 defines a LVCMOS input buffer such that step 702 forms a memory controller having a LVCMOS input buffer and a SSTL18-compliant output buffer.

Though DRAM devices 302 are described as being DDR2 SDRAM devices and memory controller 301 is disclosed to be configured to provide SSTL18-compliant output and receive SSTL-compliant input, alternatively, other types of DRAM devices and memory standards could be used. In one embodiment DRAM devices 302 are DDR3 DRAM devices and memory controller 301 is configured to provide output that complies with a 1.5-volt SSTL interface standard and input buffer circuits 304 receive input that complies with a 1.5-volt SSTL interface standard. In this embodiment, DRAM devices 302 are DDR3 SDRAM devices, with memory controller 301 and DDR3 SDRAM devices conforming to the JESD79-3C standard. In one embodiment in which DDR3 SDRAMS are controlled, the single-ended buffer 401 and the output buffer 305 are powered by a Vcco of 1.5 volts.

Because single-ended buffers draw significantly less static power than differential amplifiers, the use of a single-ended buffer 401 instead of a differential amplifier significantly reduces the power consumption of memory controller 304. Accordingly, the methods and apparatus of the present invention provide a memory controller having reduced static power requirements. In addition, the method and apparatus of the present invention allow for control of DDR2 SDRAM devices and have reduced power requirements as compared to conventional devices and systems that have input circuits that use differential amplifiers for receiving input.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. An integrated circuit device having configurable resources, the integrated circuit device configured as a memory controller that includes a plurality of bi-directional pins, an input buffer circuit that is operable to receive SSTL-compliant input and an output buffer that is operable to generate SSTL-compliant output, wherein the input buffer circuit includes a first single-ended buffer coupled to a first voltage level and to a ground voltage, the first single-ended buffer having an input coupled to one of the bi-directional pins and having an output coupled to control logic of the memory controller,
  wherein the input buffer circuit further comprises at least one additional buffer comprising an input coupled to one of the bi-directional pins,
  wherein the at least one additional buffer selectively couples the input to the control logic according to whether a power connection of the at least one additional buffer is connected to a voltage level sufficient for the at least one additional buffer to be operable.

2. The integrated circuit device of claim 1 wherein the at least one additional buffer is coupled to a second voltage level that is different from the first voltage level.

3. The integrated circuit device of claim 1 wherein the input buffer circuit is not fully compliant with an SSTL specification.

4. The integrated circuit device of claim 2 wherein the integrated circuit device is a field programmable gate array device and wherein the first voltage source is a 1.8 Volt source.

5. The integrated circuit device of claim 4 wherein the output buffer includes a differential buffer that is powered by the first voltage level.

6. The integrated circuit device of claim 1 wherein the input buffer circuit further comprises a differential amplifier having a first input electrically coupled to one of the bi-directional pins and having a second input coupled to a second voltage source, the power connection of the differential amplifier not connected to a voltage level such that the differential amplifier is not operable to couple input to the control logic.

7. The integrated circuit device of claim 6 wherein the second voltage source is 0.9 Volts.

8. The integrated circuit device of claim 1 wherein each of the input circuits further comprises a second single-ended buffer having an input electrically coupled to one of the bi-directional pins, the power connection of the second single-ended buffer not connected to a voltage source such that the second single-ended buffer is not operable to couple input to the control logic, wherein the integrated circuit device can be configured such that the power connection of the second single-ended buffer is coupled to a auxiliary power supply pin for coupling LVCMOS 33, PCI and LVTTL input to the control logic.

9. The integrated circuit device of claim 8 wherein each of the input circuits further comprises a third single-ended buffer having an input electrically coupled to one of the bi-directional pins, the power connection of the third single-ended buffer not connected to a voltage source such that the third single-ended buffer is not operable to couple input to the control logic, wherein the integrated circuit device can be configured such that the power connection of the third single-ended buffer is coupled to a core logic power supply for coupling LVCMOS12, LVCMOS15 and LVCMOS18 input to the control logic.

10. The integrated circuit device of claim 9 wherein the integrated circuit device can be configured such that the power connection of the first single-ended buffer is coupled to an a 2.5 Volt power supply for coupling LVCMOS25 input to the control logic.

11. A system comprising:
  a circuit board;
  a plurality of Dynamic Random Access Memory (DRAM) devices coupled to the circuit board; and
  an integrated circuit device having configurable resources, the integrated circuit device coupled to the circuit board and electrically coupled to the DRAM devices so as to form a plurality of parallel channels of DRAM memory, the integrated circuit device configured as a memory controller that includes a plurality of bi-directional pins that are electrically coupled to the DRAM devices, the memory controller including an input buffer circuit that is operable to receive SSTL-compliant input and an output buffer that is operable to generate SSTL-compliant output, wherein the input buffer circuit comprises a first single-ended buffer coupled to a first voltage level and to a ground voltage, the first single-ended buffer having an input coupled to one of the bi-directional pins and having an output coupled to control logic of the memory controller,
  wherein the input buffer circuit further comprises at least one additional buffer comprising an input coupled to one of the bi-directional pins,
  wherein the at least one additional buffer selectively couples the input to the control logic according to whether a power connection of the at least one additional buffer is connected to a voltage level sufficient for the at least one additional buffer to be operable.

12. The integrated circuit device of claim 11 wherein the at least one additional buffer is coupled to a second voltage level that is different from the first voltage level.

13. The integrated circuit device of claim 11 wherein the input buffer circuit is not fully compliant with an SSTL specification.

14. The integrated circuit device of claim 11 wherein the output buffer includes a differential output buffer that is powered by the first voltage level and further wherein the first voltage source is 1.8 Volts.

15. The integrated circuit device of claim 12 wherein the input buffer circuit further comprises:
  a differential amplifier having a first input electrically coupled to one of the bi-directional pins and having a second input coupled to a reference voltage of 0.9 Volts, the power connection of the differential amplifier not connected to a voltage source such that the differential amplifier is not operable to couple input to the control logic wherein the integrated circuit device can be configured such that the power connection of the differential amplifier is coupled to an 1.8 Volt power supply for coupling SSTL18 input to the control logic;
  a second single-ended buffer having an input electrically coupled to one of the bi-directional pins, the power connection of the second single-ended buffer not connected to a voltage source such that the second single-ended buffer is not operable to couple input to the control logic, wherein the integrated circuit device can be configured such that the power connection of the second single-ended buffer is coupled to a auxiliary power supply pin for coupling LVCMOS33, PCI and LVTTL input to the control logic; and
  a third single-ended buffer having an input electrically coupled to one of the bi-directional pins, the power connection of the third single-ended buffer not connected to a voltage source such that the third single-ended buffer is not operable to couple input to the control logic, wherein the integrated circuit device can be configured such that the power connection of the third single-ended buffer is coupled to a core logic power supply for coupling LVCMOS12, LVCMOS15 and LVCMOS18 input to the control logic.

16. The integrated circuit device of claim 12 wherein the integrated circuit device is a field programmable gate array device and wherein the integrated circuit device can be configured such that the power connection of the first single-ended buffer is coupled to an a 2.5 Volt power supply for coupling LVCMOS25 input to the control logic.

17. A method for controlling a memory device comprising:
defining a configuration of a memory controller so as to select an input buffer circuit having a single-ended buffer and select an SSTL-compliant output buffer, where the single-ended buffer and the SSTL-compliant output buffer are powered at a first voltage Level; and
configuring an integrated circuit device using the defined configuration so as to form a memory controller having the single-ended buffer and having the SSTL-compliant output buffer,
wherein defining a configuration of a memory controller further comprises selecting an SSTL18 compliant output buffer, wherein the input buffer circuit is not fully compliant with the SSTL18 specification.

18. The method of claim 17 further comprising:
coupling the integrated circuit device to a Dynamic Random Memory (DRAM) device; and
operating the integrated circuit device to store and retrieve data.

19. The method of claim 17 wherein the input buffer circuit can be defined such that the single-ended buffer provides Low Voltage Complimentary Metal Oxide Semiconductor (LVCMOS) input, the configuring an integrated circuit device forming a memory controller having a LVCMOS input buffer.

20. The method of claim 17, wherein selecting the input buffer circuit comprises selecting the single-ended buffer from a plurality of buffers by connecting a power connection of the single-ended buffer to a voltage level sufficient for the single-ended buffer to be operable and not connecting a power connection of each other buffer of the plurality of buffers to a voltage level sufficient for each other buffer of the plurality of buffers to be operable.

* * * * *